March 19, 1963   E. J. CROSSLAND   3,082,419
CONTINUOUS WAVE HYPERBOLIC SYSTEM FOR LANDING AIRCRAFT
Filed Nov. 4, 1959   3 Sheets-Sheet 1

INVENTOR
EDWARD J. CROSSLAND
by
Mason, Kolehmainen, Rathburn and Wyss
ATTORNEYS.

March 19, 1963

E. J. CROSSLAND

3,082,419

CONTINUOUS WAVE HYPERBOLIC SYSTEM FOR LANDING AIRCRAFT

Filed Nov. 4, 1959

INVENTOR
EDWARD J. CROSSLAND by Mason, Kolehmainen,
Rathburn and Wyss.
ATTORNEYS.

United States Patent Office 3,082,419
Patented Mar. 19, 1963

3,082,419
CONTINUOUS WAVE HYPERBOLIC SYSTEM FOR LANDING AIRCRAFT
Edward J. Crossland, Tulsa, Okla., assignor to Seismograph Service Corporation, Tulsa, Okla., a corporation of Delaware
Filed Nov. 4, 1959, Ser. No. 850,946
15 Claims. (Cl. 343—108)

The present invention relates particularly to a method and apparatus for directing the movement of aircraft along a desired flight path, and more particularly to a method and apparatus for use in blind landing of aircraft. Specifically, the invention relates to an aircraft landing system of the type employing phase comparison in pairs of position indicating signals continuously radiated from a plurality of horizontally spaced transmitting points and from a plurality of vertically spaced transmitting points to provide indications of the progress of a mobile receiving point on the aircraft along a desired flight path oriented in a known position with respect to the spaced transmitting points. The invention is a continuation in part of abandoned application Serial No. 557,084 filed by the present inventor on January 3, 1956.

In systems of the particular type referred to, the continuous waves radiated from each pair of horizontally spaced transmitters and from each pair of vertically spaced transmitters bears phase relationships which change as a function of the changing position of a receiving point relative to the spaced transmitting points. More particularly, the phase relationship between the waves radiated from each pair of transmitting points of the system are characterized by isophase conditions existing along three dimensional surfaces which are hyperbolic in contour about each pair of transmitting stations as foci. Specifically, an isophase relationship exists between the waves radiated from each pair of transmitters along a three dimensional surface produced by rotating a hyperbolic line about an axis coinciding with the base line connecting the pair of transmitters, which surface will hereinafter be referred to as an isophase surface. With the system arrangement described above the position of a receiving point relative to the hyperbolic isophase surfaces may be determined by measuring the phase relationship between continuous waves radiated from each pair of transmitters.

Systems of the character described are exceedingly accurate insofar as the indications produced at the receiving point are concerned. To obtain the desired accuracy however, it is necessary to maintain phase synchronization between the continuous waves radiated by each pair of spaced transmitters or, alternatively, so to arrange the system that phase shifts between the radiated waves are compensated during the phase comparing operation.

Phase synchronization of the waves radiated from the spaced transmitters is, in many cases, difficult and has generally been effected only by the use of relatively elaborate and somewhat delicate instrumentation not well adapted for the continuity of service required in airway traffic control systems. Systems of the continuous wave hyperbolic type have been proposed in which the phase shift problem is obviated by utilizing the so-called heterodyne principle disclosed and broadly claimed in Honore Patent No. 2,148,267. In the system disclosed in the latter patent the phase shift problem is obviated by heterodyning the carrier waves of each pair of spaced transmitters at a fixed link transmitting point, and modulating the difference frequency component of the heterodyned wave as a reference signal upon the carrier output of the link transmitter for radiation to the receiving point, where the difference frequency component is detected and phase compared with the difference frequency signal derived by directly heterodyning the transmitted continuous waves at the receiving point. In this manner, phase shifts between the continuous waves radiated from each pair of spaced transmitters are completely compensated with the result that the measured phase angle is truly representative of the location of the receiving point relative to the isophase surfaces.

In prior arrangements employed in blind landing, the location of an aircraft in space with respect to the airfield runway has generally been indicated by following a radio direction line of uniform intensity or, alternatively, by guiding the aircraft along a line of zero difference of intensity between the waves radiated from spaced transmitting points. However, these arrangements have generally been inaccurate due to the wide variation in amplitude between received signals resulting from entirely unpredictable variations in radio receiving conditions encountered as the aircraft is moved through space.

While phase comparison systems have been suggested heretofore for use in aircraft landing such systems have not been altogether satisfactory since they rely upon the radiation of synchronized waves from the transmitters of the ground waves. The synchronization is attained only by the use of elaborate and expensive equipment and usually involves the use of cables connecting the transmitters to be synchronized. However, the stringing of cables in the vicinity of the airfield creates a hazard if the cables are located above ground and, if they are located below ground, the runway or other portions of the field must be dug.

Another problem encountered in systems of prior design flows from the requirement that any number of aircraft must be able to use the facilities at the landing field. In addition, each aircraft must be able to use the landing facilities at other fields so that the aircraft can complete a multiple stop flight. The systems of the prior art have failed to take these problems into account.

Accordingly, a primary object of the present invention is to provide a new and improved blind landing system for aircraft which is considerably more accurate and efficient than the systems heretofore proposed.

Another object of the present invention is to provide indications of the position of an aircraft relative to a desired flight path which are clearly understandable and may be readily interpreted in order to facilitate an instantaneous correction of any deviation of the aircraft from the desired flight path.

It is a further object of the present invention to provide an improved blind landing system of the continuous wave type which combines economy of channel frequencies employed with precise indications of the location of an aircraft relative to the desired line of flight.

A still further object of the present invention is to provide a blind landing system of the continuous wave type employing a minimum amount of transmitting and receiving equipment while at the same time effecting substantially continuous service.

It is likewise an object of the present invention to provide an improved landing system of the character described above which is capable of guiding an infinite number of aircraft in flight provided only that the transmitting equipment at the ground station is properly calibrated with respect to the receiving equipment aboard the aircraft.

It is also an object of the present invention to provide improved transmitting and receiving equipment for use in radio directed blind landing systems of the above indicated character.

The invention has for a further object the provision of a method for use in systems of the character indicated above to coordinate the operation of transmitting equipment employed at a plurality of spaced apart landing fields with receiving equipment carried by the aircraft.

The invention, both as to its organization and method of operation, together with further objects and advantages thereof, will best be understood by reference to the specification taken in connection with the accompanying drawings in which.

In accordance with the present invention, the foregoing and other objects are realized by providing a ground transmitting system including a pair of horizontally spaced transmitters, a pair of vertically spaced transmitters and at least one reference or link transmitter. Both the horizontally spaced transmitters and the vertically spaced transmitters are oriented equidistantly from and along a line extending normal to the desired line of flight of the aircraft. The waves radiated from the horizontally spaced pair of transmitters and those radiated from the vertically spaced transmitters are respectively heterodyned by the reference transmitting equipment and the resulting beat frequencies are radiated as modulation components to the receiving equipment on board the aircraft. The latter receiving equipment functions to detect the modulation components and to heterodyne the waves radiated from each spaced pair of transmitters to produce signals for phase comparison in order to provide separate indications of the horizontal and vertical positions of the aircraft relative to the desired line of flight.

Figure 1:
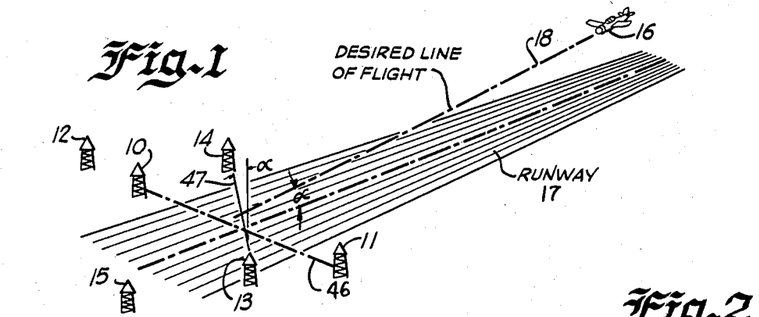
FIG. 1 is a diagrammatic perspective view illustrating the apparatus employed in directing an aircraft along a desired line of flight to facilitate landing on the runway of an airfield.

Referring now to the drawings, and more particularly to FIG. 1 thereof, the present invention is illustrated as embodied in a blind landing system for guiding an aircraft 16 along a desired line of flight 18 in order to bring the aircraft into proper position for landing on the runway 17 of an airfield. As indicated in FIG. 1, the desired flight path is disposed at an angle α with respect to the horizontal plane of the ground or with respect to the runway 17 which angle may be referred to as the desired glide angle of the aircraft 16. The transmitting equipment of the system shown in FIG. 1 comprises a pair of horizontally spaced transmitters 10 and 11 located on opposite sides of and equidistant from the center of the runway 17 along a line extending normal to the runway together with a reference or link transmitter 12 spaced from the transmitters 10 and 11, thereby providing a two-foci, hyperbolic, continuous wave system for furnishing information at a mobile receiving unit 19 carried by the aircraft 16 indicative of the horizontal position of the aircraft relative to the desired line of flight 18. The transmitting equipment further comprises a pair of vertically spaced transmitters 13 and 14 disposed on opposite sides of and equidistant from the line of flight 18 along a line extending normal thereto together with a reference or link transmitter 15 spaced from the transmitters 13 and 14, thereby to provide information at the mobile receiver unit 19 indicative of the vertical position of the aircraft relative to the desired line of flight. It will be evident that any suitable support may be provided for mounting the transmitters 13 and 14 at a position preferably located to the side of the runway 17 so as not to interfere with the flight of the aircraft. The line 47 joining the transmitters 13 and 14 forms an angle α with respect to the vertical. As described more fully below, the transmitters 10 and 11 are equipped to radiate position indicating signals in the form of continuous waves of different frequencies, while the transmitting unit 12 is equipped to heterodyne the signals radiated by the transmitters 10 and 11 in order to produce a beat frequency signal for modulation upon a carrier wave radiated to the mobile receiver unit 19. Similarly, the transmitters 13 and 14 are equipped continuously to radiate position indicating signals in the form of unmodulated waves having frequencies differing from each other and from the signals radiated by the transmitters 10, 11 and 12. Reference transmitter 15 is adapted to heterodyne the signals radiated by the transmitters 13 and 14 to produce a beat frequency for modulation upon a carrier wave radiated to the mobile receiver unit 19, this particular carrier wave having a frequency which differs from that of the signals radiated by each of the remaining transmitters of the system.

Figure 2:
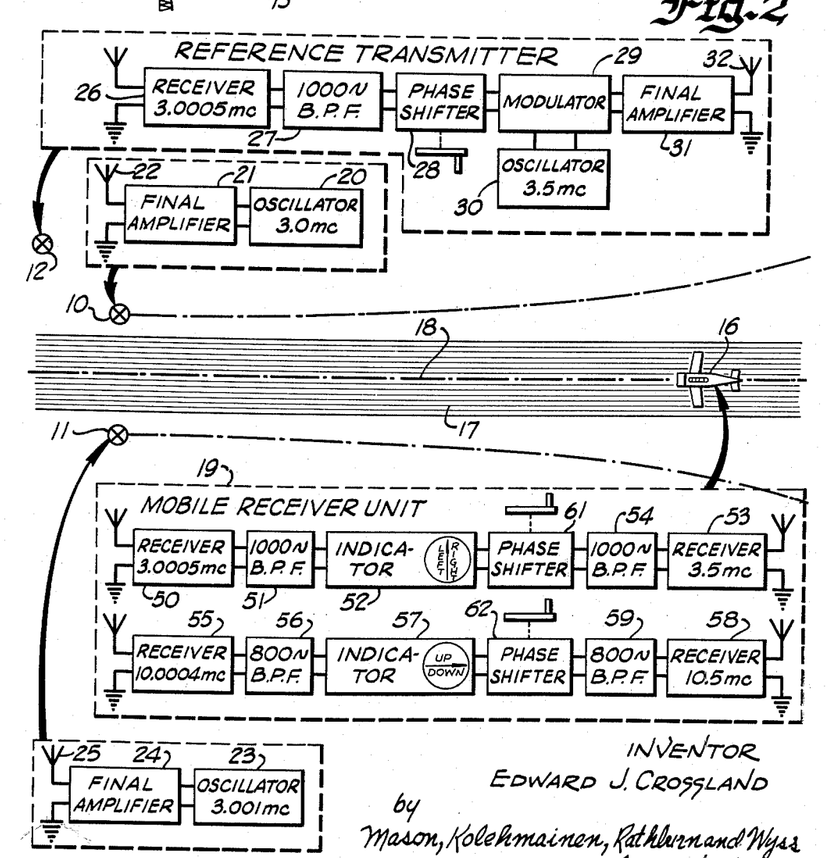
FIG. 2 diagrammatically illustrates the receiving equipment provided on the aircraft together with the transmitting equipment employed at the horizontally spaced transmitters of the system shown in FIG. 1.

Referring now to FIG. 2 for a description of the equipment provided at the transmitters 10, 11 and 12 and on board the aircraft 16, it will be observed that the equipment at the transmitter 10 comprises an oscillator or signal generator 20 for producing radio frequency signals having a frequency of 3.0 megacycles together with a final amplifier 21 for amplifying these signals for space radiation from an emitting antenna 22. The equipment provided at the transmitting station 11 comprises an oscillator or signal generator 23 for producing radio frequency signals having a frequency of 3.001 megacycles and a final amplifier 24 for increasing the amplitude of the signals for radiation from a transmitting antenna 25. The equipment provided at the reference or link transmitter 12 includes a receiver 26 center tuned to a frequency of 3.0005 megacycles and having frequency selective characteristics such that the signals radiated from both of the horizontally spaced transmitters 10 and 11 are accepted while all other radiated signals are rejected. The signals accepted by the receiver 26 are heterodyned to produce a 1000 cycle beat frequency signal which is passed through a 1000 cycle band pass filter 27 and through a phase shifter 28, the purpose of which will be described more fully hereinafter, to a modulator 29. The latter modulator 29 is also excited with radio frequency signals having a frequency of 3.5 megacycles developed by an oscillator or signal generator 30 with the result that the output of the modulator comprises an amplitude modulated carrier wave. This modulated carrier wave is fed to a final amplifier 31 for radiation from a transmitting antenna 32. Similarly, and referring particularly to FIG. 3, the equipment provided at transmitter 13 comprises an oscillator or signal generator 33 developing signals having a frequency of 10.0 megacycles for application through a final amplifier 34 to a radiating antenna 35. The transmitting unit 14 includes an oscillator 36 developing signals having a frequency of 10.0008 megacycles for application through a final amplifier 37 to a radiating antenna 38. At the reference transmitter 15 there is provided a receiver 39 center tuned to a frequency of 10.0004 megacycles for accepting the signals radiated by the transmitters 13 and 14. The receiver 39 is sufficiently selective to reject the signals radiated by all of the transmitters of the system except those from the transmitters 13 and 14. The two signals accepted by the receiver 39 are heterodyned to develop an 800 cycle beat frequency signal for passage through an 800 cycle band pass filter 40 and through a phase shifter 41 to a modulator 42. The latter modulator is also supplied with radio frequency signals having a frequency of 10.5 megacycles developed by a signal generator or oscillator 43 and, as a result, the output of the modulator 42 comprises a radio frequency signal amplitude modulated with the 800 cycle beat frequency signal developed by the receiver 39. This amplitude modulated signal is amplified by a final amplifier 44 and is then radiated from an emitting antenna 45.

As indicated above, the signals radiated from the transmitting units described above are employed at the mobile receiver unit 19 to produce separate indications representative of the horizontal and vertical position of the aircraft 16 relative to the desired line of flight. To this end, as shown in FIG. 2, the mobile receiver unit 19 comprises a receiver 50 center tuned to a frequency of 3.0005 megacycles for accepting the signals radiated from the horizontally spaced transmitters 10 and 11 and for rejecting the signals radiated from the remaining transmitters. The two signals accepted by the receiver 50 are heterodyned to develop a 1000 cycle beat frequency signal for application through a band pass filter 51 to the left hand set of signal input terminals of a horizontal position indicator 52. The mobile receiver unit 19 further comprises an amplitude modulation receiver 53 center tuned to a frequency of 3.5 megacycles for receiving the modulated carrier wave radiated from the reference transmitter 12 and for rejecting the signals radiated from all of the remaining transmitters of the system. The 1000 cycle beat frequency modulated upon the carrier wave radiated from the reference transmitter 12 is detected and reproduced by the receiver 53 for passage through a band pass filter 54 and through a manually adjustable phase shifter 61 to the right hand set of signal input terminals of the indicator 52. As will be readily understood by those skilled in the art, and particularly from an understanding of the aforementioned Honore patent, the indicator 52 measures the phase relationship between the two signals applied to its opposed sets of signal input terminals and produces an indication of the location of the aircraft 16 relative to hyperbolic isophase surfaces having foci at the transmitters 10 and 11. Along a base line 46 interconnecting the transmitters 10 and 11 these isophase surfaces will be spaced apart a distance equal to approximately one-half wave length of the mean frequency between the two signals radiated by the transmitters 10 and 11. At the indicated frequencies, this spacing will be a distance of approximately 165 feet and, accordingly, if the transmitters 10 and 11 or, more specifically, the transmitting antennas 22 and 25, are spaced apart a distance which does not exceed 165 feet the indications provided by the indicator 52 are non-ambiguous in the sense that the maximum variation in phase difference between the two signals applied to this indicator will be 360 degrees regardless of the movement of the aircraft 16. Whenever the two signals applied to the indicator 52 are in phase opposition or are 180 degrees out of phase, an "on course" indication will be provided if the reference transmitter 12 is properly calibrated in the manner discussed below. With the transmitters thus calibrated, a 180 degree phase difference between signals applied to the horizontal position indicator 52 indicates that the aircraft lies along a plane bisecting the runway 17, which plane will correspond to the degenerate hyperbola of the horizontal transmitting system, i.e., a hyperbolic isophase plane extending perpendicular to and bisecting the base line 46. The desired line of flight of the aircraft 16, of course, coincides with this hyperbolic plane, and in the event of deviation of the aircraft from the line 18 in a horizontal direction, the signals applied to the indicator 52 will no longer be in phase opposition. Accordingly, an "off course" indication will be provided in a direction which will indicate whether the aircraft 16 has deviated to the right or to the left of its desired line of flight. The pilot or navigator of the aircraft may then make the necessary corrections to bring the craft back to the desired line of flight, at which time the signals applied to the indicator 52 will again be in phase opposition and an "on course" indication will be provided. From the foregoing discussion it will be apparent that the indicator 52 provides a non-ambiguous indication representative of the horizontal location of the aircraft 16 relative to the desired line of flight 18.

In order to effect the blind landing of aircraft it is also essential to provide an indication of the vertical position of the aircraft relative to the desired line of descent of the aircraft and, to this end, the mobile receiver unit 19 includes a receiver 55 center tuned to a frequency of 10.0004 megacycles for accepting the carrier wave radiated by the vertically spaced transmitters 13 and 14 and for rejecting the signals radiated from the remaining transmitters of the system. The two signals accepted by the receiver 55 are heterodyned to produce an 800 cycle beat frequency signal for application through a band pass filter 56 to the left hand set of signal input terminals of a vertical position indicator 57. The mobile receiver unit 19 further comprises a receiver 58 tuned to a frequency of 10.5 megacycles for accepting the modulated carrier wave radiated by the reference transmitter 15 and for rejecting all of the signals radiated by the remaining transmitters of the system. The receiver 58 functions to detect and reproduce the 800 cycle beat frequency signal modulated upon the carrier wave radiated by the reference transmitter 15. The 800 cycle reference signal appearing at the output of the receiver 58 is passed through a band pass filter 59 and through a manually adjustable phase shifter 62 to the right hand set of signal input terminals of the vertical position indicator 57. As will be recognized by those skilled in the art, and particularly from an understanding of the aforementioned Honore patent, the indicator 57 produces an indication representative of the location of the mobile receiver unit 19 relative to hyperbolic isophase surfaces having foci at the transmitters 13 and 14. Along a base line 47 interconnecting the transmitters 13 and 14 these isophase surfaces are spaced apart a distance corresponding to approximately one-half wave length of the mean frequency of the signals radiated by the transmitters 13 and 14. At the indicated frequencies this spacing is a distance of approximately forty-nine feet and, accordingly, if the transmitters 13 and 14 or, more specifically, the transmitting antennas 35 and 38, are separated by a distance not exceeding forty-nine feet the indications provided by the vertical position indicator 57 will be non-ambiguous. Thus, if the spacing between the transmitters 13 and 14 does not exceed forty-nine feet, the signals applied to the opposed sets of signal input terminals of the indicator 57 can vary in phase difference by a maximum of three hundred sixty degrees upon movement of the aircraft 16. The phase relationship of the reference signal radiated by the reference transmitter 15 is so adjusted in the manner described below that whenever the two signals applied to the opposed sets of signal input terminals of the vertical position indicator 57 are in phase opposition, that is to say when these signals are exactly one hundred eighty degrees out of phase, the aircraft 16 will be located along the degenerate hyperbola of the vertical transmitting system, i.e., a plane which is normal to the base line 47 and equidistant from the transmitters 13 and 14. Hence, whenever the signals applied to the indicator 57 are in phase opposition an "on course" indication will be provided to indicate that the aircraft 16 lies along a plane passing through the desired line of flight 18. The intersection of the degenerate hyperbolic plane of the vertical transmitting system and the degenerate hyperbolic plane of the horizontal transmitting system, of course, is a straight line coinciding with the desired line of flight 18. Whenever the aircraft 16 tends to deviate in a vertical direction from the desired line of flight, the signals applied to the vertical position indicator 57 will no longer be in phase opposition and the indication provided will be representative of the amount and direction of such deviation. If the phase indicator 57 provides an "off course" indication, the pilot or navigator may immediately take the necessary steps to bring the aircraft 16 back on course. Thus, it will be observed that the phase measurement effected by the indicator 57 is indicative of the vertical position of the aircraft 16 relative to the desired line of flight of the aircraft.

In view of the foregoing description it will be apparent that the indications appearing upon the indicators 52 and 57 facilitate navigation of the aircraft 16 along a flight path 18 which will bring the aircraft into proper position for landing on the runway of the aircraft even though weather conditions may obscure the ground from the view of the pilot. In order to enable the aircraft 16 to follow such a flight path, however, the mobile receiver unit 19 must be calibrated to the transmitters of the system. To effect such a calibration the receiver may be placed on the ground along a line bisecting the runway of the aircraft and the phase shifter 61 at the mobile receiving unit 19 may be adjusted until the phase difference between the two signals applied to the indicator 52 is exactly one hundred eighty degrees, at which time the indicator 52 will provide an "on course" indication. A similar procedure may be followed for the signals radiated by the vertical transmitters 13, 14 and 15 by placing the receiver upon an elevated structure at the ground in such position that the receiver lies along the desired line of flight 18 or along a plane passing through the desired line of flight and normal to the base line 47, at which time the phase shifter 62 at the mobile receiving unit 19 may be adjusted until the signals applied to the indicator 57 are exactly one hundred eighty degrees out of phase, as indicated by an "on course" reading of the indicator 57. The receiver may, of course, be adjusted by placing it at any known location with respect to the desired line of flight and by then adjusting the phase shifters 61 and 62 until the readings on the indicators 52 and 57 agree with the known location but, for simplicity in making the adjustments, the location of the receiver directly on the desired line of flight is preferred. The first receiver may also be calibrated to the field transmitting equipment by adjusting the phase shifters 28 and 41 until the indications at the receiving unit agree with the known position of the receiver. After the phase shifters 28 and 41 have been set, however, they cannot be further adjusted without recalibrating all of the receivers using the landing field. Subsequent receivers using the landing field are calibrated to the ground equipment by adjusting their phase shifters 61 and 62 in the manner described above with each receiver being positioned at a known location.

It is also necessary to correlate the receiving unit with the transmitting equipment at other landing fields in the system and, to this end, the receiving unit may be moved to a second landing field where it is oriented at a known location. The phase shifters 61 and 62 should not be adjusted because any such adjustment will result in improper indications when the receiver returns to the first landing field. Thus, at the second landing field, the phase shifters 28 and 41 are adjusted until the readings on the indicators 52 and 57 agree with the known location of the receiver. By following this procedure, all ground installations may be calibrated and the airborne receiving equipment would then operate correctly regardless of the particular airport at which the landing was being made. Thus, each airborne installation could be used by any number of aircraft equipped with receiving apparatus calibrated to that particular installation. It will be observed that the landing system shown in FIGS. 1 to 3, inclusive, is relatively simple to install and maintain with the result that substantially continuous operation may be effected at minimum cost.

Figure 3:
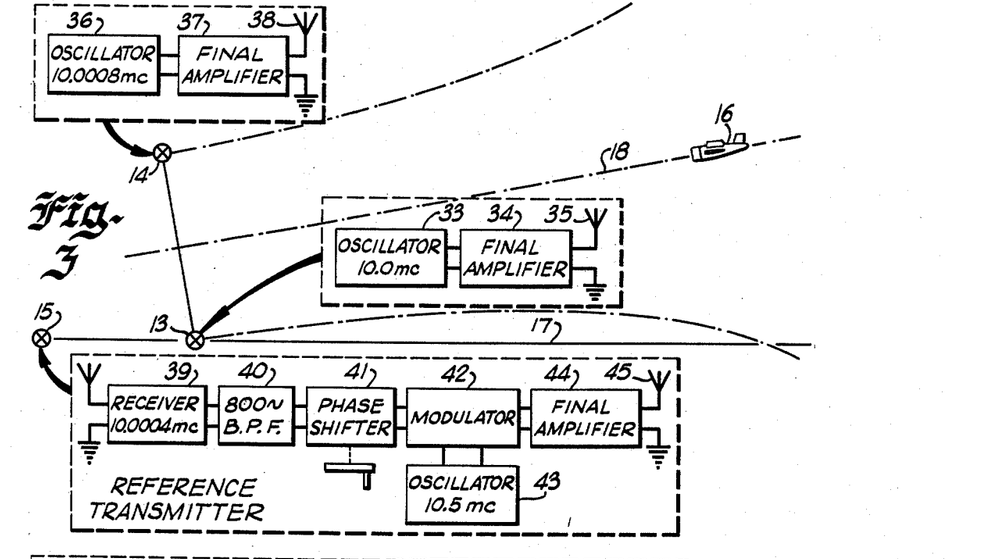
FIG. 3 diagrammatically illustrates the equipment provided at the vertically spaced transmitters of the system shown in FIG. 1.
Figure 5:
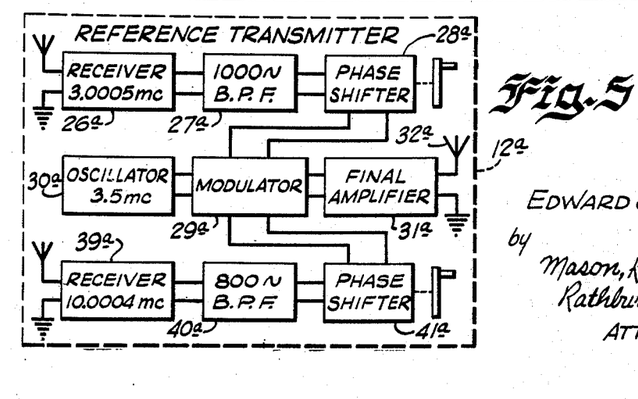

The equipment illustrated in FIGS. 1 to 3, inclusive, may be simplified somewhat by radiating the reference signals for both the horizontal and vertical transmitters from a common reference station. To this end, as illustrated in FIG. 5, a reference transmitter 12a may be provided for use with transmitters 10, 11, 13 and 14 of the type illustrated in FIGS. 2 and 3. The reference trasmitter 12a includes a receiver 26a corresponding to the receiver 26 of the reference transmitter 12 for receiving the signals radiated by the horizontally spaced transmitters 10 and 11 and for rejecting both of the signals radiated by the vertically spaced transmitters 13 and 14 as well as the signal radiated from the reference transmitter 12a. The two signals accepted by the receiver 26a are heterodyned to produce a 1000 cycle beat frequency signal which is passed through a band pass filter 27a and through a manually adjustable phase shifter 28a to a modulator unit 29a. The reference transmitter 12a further comprises a receiver 39a corresponding to the receiver 39 at the reference transmitter 15 shown in FIG. 3, for accepting the signals radiated by the vertically spaced transmitters 13 and 14 and for rejecting the signals radiated from the horizontally spaced transmitters 10 and 11 and from the reference transmitter 12a. The two signals accepted by the receiver 39a are heterodyned to develop an 800 cycle beat frequency signal which is passed through filter 40a and through a manually adjustable phase shifter 41a to the modulator 29a. The modulator 29a functions to modulate the carrier wave signal of 3.5 megacycles developed by an oscillator 30a with the 800 cycle and 1000 cycle beat frequency signals respectively developed by the receivers 39a and 26a. The output of the modulator 29a, comprising a carrier wave simultaneously modulated with 800 cycle and 1000 cycle signals, is applied through a final amplifier 31a to a transmitting antenna 32a.

Figure 4:
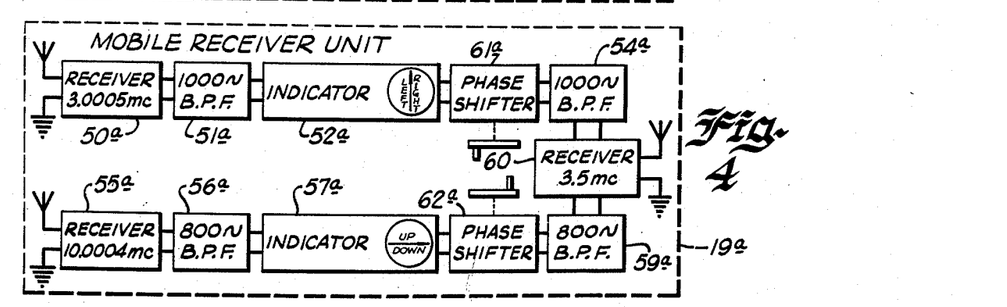
FIGS. 4 and 5 diagrammatically illustrate a modified arrangement of a portion of the blind landing system of the present invention, FIG. 4 showing a modification of the receiving equipment carried by the aircraft, and FIG. 5 showing a modified arrangement of the reference transmitter of the ground transmitting apparatus as used in conjunction with the receiving equipment illustrated in FIG. 4.

When a reference transmitter of the type shown in FIG. 5 is employed at the ground station, the mobile receiving unit is provided with equipment illustrated in FIG. 4 wherein a single receiver is provided for detecting both of the reference signals transmitted from the transmitter 12a. To this end, the mobile receiver unit 19a comprises a receiver 60 tuned to receive the carrier wave radiated from the reference transmitter 12a and to reject the signals radiated from both the vertically spaced transmitters 13 and 14 and the horizontally spaced transmitters 10 and 11. The receiver 60 functions to detect and reproduce both the 800 cycle and 1000 cycle modulation components appearing upon the carrier wave received from the reference transmitter 12a. The 1000 cycle reference signal is passed by the filter 54a through a manually adjustable phase shifter 61a to the right hand set of signal input terminals of horizontal position indicator 52a. The filter 54a, of course, functions to reject the 800 cycle reference signal. Similarly, filter 59a rejects the 1000 reference signal but passes the 800 cycle signal through a manually adjustable phase shifter 62a to the right hand set of signal input terminals of vertical position indicator 57a. Receiver 50a heterodynes the two signals radiated from horizontally spaced transmitters 10 and 11 and produces a 1000 cycle beat frequency signal which is passed through filter 51a to the left hand set of signal input terminals of horizontal position indicator 52a. Receiver 55a heterodynes the signals radiated from the vertically spaced transmitters 13 and 14 to produce an 800 cycle beat frequency signal for passage through band pass filter 56a and for application to the left hand set of signal input terminals of vertical position indicator 57a. The indicators 52a and 57a function in the manner described above to provide indications representaive of the horizontal and vertical positions, respectively, of the aircraft 16 relative to the desired line of flight 18. The phase shifting networks 28a, 41a, 61a and 62a may be adjusted in the manner described above to calibrate all of the ground installations and the receiving unit 19a carried by the aircraft.

The system illustrated in FIGS. 1 to 3, inclusive, and that illustrated in FIGS. 4 and 5, may be subject to some objection from the standpoint of the number of frequency channels employed in view of the fact that the first described system requires a total of four frequency channels and the second described system utilizes three such channels. To effect an even further economy of frequencies employed, a system of the type illustrated in FIG. 6 may be used. In this system a common transmitter is employed for radiating one of the vertical position indicating signals and one of the horizontal position indicating signals and a common reference transmitter radiates the reference signals for effecting both the horizontal and vertical position indications. Specifically, the system illustrated in FIG. 6 comprises a pair of horizontally spaced transmitters 110 and 111 disposed equidistant from and on opposite sides of the center of the runway on which the aircraft is to land. A vertical or elevation position transmitter 113 is disposed above one of the transmitters 110 or 111 and, for purposes of explanation, it will be assumed that the transmitter 113 is disposed directly above the base transmitter 110. The reference transmitter 112 is, of course, located some distance from all of the transmitters 110, 111 and 113.

Figure 6:
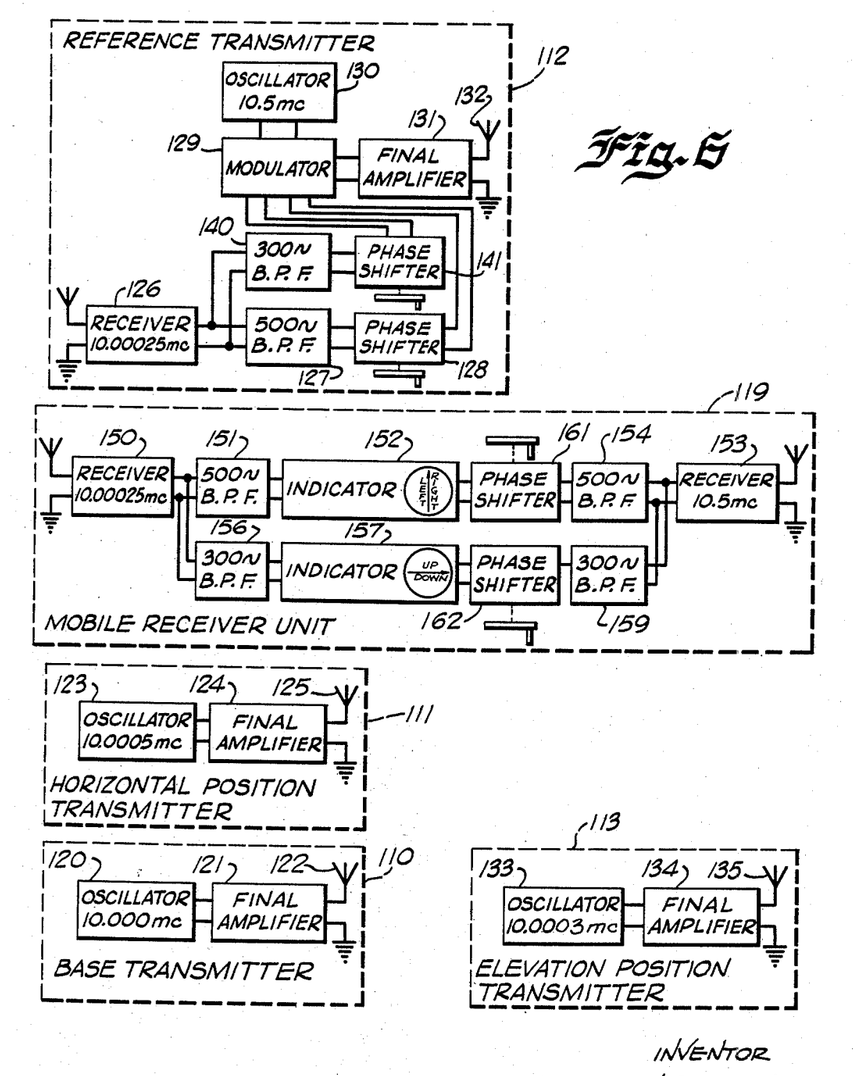
FIG. 6 is a diagrammatic illustration of a still further modification of the transmitting and receiving equipment employed in a blind landing system characterized by the features of the present invention.

The equipment provided at the horizontal position transmitter 111 comprises an oscillator 123 for developing signals having a frequency of 10.0005 megacycles and a final amplifier 124 through which these signals are applied to a radiating antenna 125. The base transmitter 110 comprises an oscillator 120 developing signals having a frequency of 10.000 megacycles for application through a final amplifier 121 to a radiating antenna 122. The elevation position transmitter 113 comprises an oscillator 133 developing signals having a frequency of 10.0003 megacycles which are applied through a final amplifier 134 to a radiating antenna 135.

The reference transmitter 112 comprises a receiver 126 for receiving the signals radiated from all three of the transmitters 110, 111 and 113 and for heterodyning these received signals in pairs to develop the corresponding beat frequency signals. The receiver 126 is, of course, sufficiently selective to reject the modulated signal radiated from the reference transmitter 112. The 500 cycle beat frequency signals developed by the receiver 126 as a result of heterodyning the signals received from the transmitters 110 and 111 is applied through a band pass filter 127 and through a phase shifter 128 to a modulator 129 while the 300 cycle beat frequency signal developed as a result of heterodyning the signals received from the transmitter 110 and 113 is applied to this modulator through a band pass filter 140 and through a manually adjustable phase shifter 141. Each of these filters, of course, rejects the 200 cycle beat frequency between the signals received from the transmitters 111 and 113. In addition, the filter 127 rejects the 300 cycle signal passed by the filter 140 while the latter filter is effective to reject the 500 cycle beat frequency signal. The modulator 129 amplitude modulates the 10.5 megacycle signal generated by oscillator 130 with the 300 cycle and 500 cycle signals respectively passed by the filters 140 and 127. The output of the modulator 129, comprising a carrier wave simultaneously modulated with two audio frequency signals of different frequency, is applied through a final amplifier 131 for space radiation to the mobile receiver unit 119.

The mobile receiver unit 119 carried by an aircraft to be landed responds to the signals radiated from the four described transmitting units by producing separate indications representative of the horizontal and vertical positions of the aircraft relative to the desired line of flight. To this end, mobile receiver unit 119 comprises a receiver 150 center tuned to a frequency of 10.00025 megacycles for accepting the signals radiated from the transmitters 110, 111 and 113 and for rejecting the modulated carrier wave radiated from the reference transmitter 112. Receiver 150, like the receiver 126 at the reference transmitter 112, functions to heterodyne in pairs the three accepted signals and produces a 300 cycle signal as a result of heterodyning the signals received from the transmitters 110 and 113, a 500 cycle signal as a result of heterodyning the signals received from the transmitters 110 and 111 and a 200 cycle signal as a result of heterodyning the signals received from the transmitters 111 and 113. The 200 cycle signal is rejected by both band pass filters 151 and 156 and, hence, has no effect on the operation of the equipment at the mobile receiver unit 119. Band pass filter 151 is effective to reject both the 200 cycle signal just described and the 300 beat frequency signal, but passes the 500 cycle signal to the left hand set of signal input terminals of the horizontal position indicator 152. similarly, band pass filter 156 functions to reject not only the 200 cycle signal described above, but also the 500 cycle signal passed by the filter 151. The 300 cycle signal appearing at the output of the receiver 150 is passed by filter 156 to the left hand set of signal input terminals of vertical position indicator 157. To provide a reference signal for phase comparison with the beat frequency signals applied to the indicators 152 and 157, a receiver 153 is provided at the mobile receiver unit for detecting and reproducing the 300 cycle and 500 cycle modulation components appearing upon the modulated carrier wave radiated by the reference transmitter 112. Band pass filter 154 rejects the reproduced 300 cycle signal but passes the 500 cycle signal through a manually adjustable phase shifter 161 to the right hand set of signal input terminals of the horizontal position indicator 152. Similarly, band pass filter 159 rejects the reproduced 500 cycle signal and passes the 300 cycle signal through a manually adjustable phase shifter 162 to the right hand set of signal input terminals of the vertical position indicator 157. As will be apparent from the foregoing description, the horizontal position indicator 152 provides an indication of the phase relationship between the two signals applied to its opposed sets of signal input terminals, and, hence, indicates the location of the mobile receiver unit 119 relative to the degenerate hyperbolic plane of the horizontal transmitting system. In order to provide non-ambiguous indications, the receivers 110 and 111 are spaced apart a distance not exceeding one-half of the wave length of the mean frequencies radiated thereby. At the indicated frequencies transmitters 110 and 111 are spaced apart a distance not exceeding approximately forty-nine feet. The ground equipment is preferably calibrated in the manner described above so that an "on course" indication occurs when the mobile receiver unit 119 is located along the degenerate hyperbolic plane of the horizontal transmitting system. Calibration of the ground equipments and the mobile receivers may be effected by adjustment of the phase shifters 128, 141, 161 and 162 in the manner previously described.

In similar manner, the indication provided by the vertical position indicator 157 is representative of the vertical position of the aircraft relative to the desired line of flight. Specifically, the indicator 157 measures the phase relationship between the two signals from the filters 156 and 159 and provides an indication of the location of the mobile receiver unit 119 relative to the degenerate hyperbolic plane of the vertical transmitting system. An "on course" indication will again be provided whenever the signals applied to the indicator 157 are exactly one hundred eighty degrees out of phase, and by proper calibration of the phase shifting network at the reference transmitter 112 such an out of phase relationship will occur whenever the aircraft lies along a plane passing through the desired line of descent and normal to the base line connecting transmitters 110 and 113. Any deviation of the aircraft in a vertical direction from the desired line of flight will immediately cause the phase relationship between the signals applied to the vertical position indicator 157 to change in a manner to indicate the magnitude and direction of the deviation. Thus, the pilot or navigator may immediately alter the course of the aircraft in order to bring the latter back to the desired line of flight. In this manner, both horizontal and vertical course indications are obtained while employing only two frequency channels.

In view of the foregoing discussion, it will be observed that the position indications provided by the various mobile receiver units described, are characterized by the extremely fine accuracies inherent with phase comparison systems of the hyperbolic continuous wave type. Thus, a deviation of only a few feet in either the horizontal or vertical direction by the aircraft from the desired line of flight will cause an immediate change in the indications provided by the receiving equipment and, as a result, the described systems provide a sensitive and highly accurate blind landing system for aircraft. In addition, as previously mentioned, the equipment employed is extremely simple and, hence, may be installed and operated at minimum cost. Moreover, any number of aircraft may use the ground facilities at a single airfield station, and, correspondingly, aircraft provided with the necessary receiving facilities may use the ground installation at any number of properly equipped airfields provided only that the ground and airborne facilities are calibrated with respect to each other.

While particular embodiments of the invention have been shown, it will be understood, of course, that the invention is not limited thereto since many modifications will occur to those skilled in the art and it is therefore contemplated by the appended claims to cover any such modifications as fall within the true spirit and scope of the invention.

What is claimed as new and desired to be secured by Letters Patent of the United States is:

1. For use in a system for landing aircraft, a method of coordinating the operation of receiving equipment carried by the aircraft with transmitting equipment located at spaced apart landing fields, each of said landing fields being provided with transmitting equipment for radiating position indicating signals of different frequency, for heterodyning said signals to develop a beat signal and for radiating a reference signal derived from said beat signal as a modulation component upon a space radiated carrier wave, said receiving equipment including means responsive during landing of the aircraft to the reference signal and to the position indicating signals for producing an indication representative of the location of said aircraft relative to the transmitting equipment at the landing field being used, said method comprising the steps of positioning said receiving equipment at a first known location at a first of said landing fields, coordinating the operation of the transmitting and receiving equipment by adjusting at least one of said equipments until the indication on said receiving equipment corresponds with the first known location, positioning said receiving equipment at a second known location at a second of the landing fields, and adjusting the phase of the reference signal developed at the second landing field prior to modulation upon its carrier wave until the indication provided by the receiving equipment agrees with said second known location, thereby permitting the aircraft carrying the receiving equipment to use the transmitting equipment at both of the landing fields.

2. The method according to claim 1 wherein each of the first and second known locations is disposed along a line extending along the center of the landing strip of the landing field.

3. The method according to claim 1 wherein each of the first and second known locations is disposed along a line defining the desired line of flight of the aircraft during landing.

4. The method according to claim 1 wherein the transmitting equipment at each landing field includes a first pair of horizontally spaced apart transmitters radiating a first pair of position indicating signals, a second pair of vertically spaced apart transmitters radiating a second pair of position indicating signals, means for heterodyning each pair of position indicating signals to develop first and second beat signals and means for radiating first and second reference signals respectively derived from the first and second beat signals and wherein the receiving equipment includes means for receiving the reference signals and for heterodyning each pair of position indicating signals to develop third and fourth beat signals for phase comparison with the first and second reference signals, respectively, to provide a first indication representing the horizontal position of the aircraft relative to a desired line of flight and to provide a second indication representing the vertical position of the aircraft relative to the desired line of flight, the step of coordinating the operation of the receiving equipment and the transmitting equipment at the first field being accomplished by adjusting said one equipment until the first indication agrees with the horizontal position of the first known location relative to the desired line of flight and until the second indication agrees with the vertical position of the first known location of the aircraft relative to the desired line of flight, the adjustment at the second landing field being accomplished by adjusting the phase of the first reference signal developed at the second field until the first indication agrees with the horizontal position of the second known location relative to the desired line of flight and by adjusting the phase of the second reference signal developed at the second field until the second indication agrees with the vertical position of the second known location relative to the desired line of flight.

5. The method defined by claim 4 wherein the steps are carried out with the first pair of transmitters at each landing field being respectively disposed on opposite sides of the desired line of flight and with the second pair of transmitters at each landing field being respectively disposed above and below the desired line of flight.

6. The method according to claim 4 wherein each of the first and second known locations is disposed along a line defining the desired line of flight of the aircraft during landing.

7. The method defined by claim 5 wherein the desired line of flight at each landing field falls along the degenerate hyperbola of a family of hyperbolic isophase lines having foci at the first pair of transmitters and also falls along the degenerate hyperbola of a family of hyperbolic isophase lines having foci at the second pair of transmitters.

8. The method defined by claim 5 wherein the transmitters of the first pair are located equidistant from the desired line of flight and wherein the transmitters of the second pair are also located equidistant from the desired line of flight.

9. The method according to claim 5 wherein each of the first and second known locations is disposed along a line defining the desired line of flight of the aircraft during landing.

10. The method according to claim 8 wherein each of the first and second known locations is disposed along a line defining the desired line of flight of the aircraft during landing.

11. A system for landing an aircraft by guiding it along a desired line of flight, comprising transmitting equipment including a pair of horizontally spaced emitters radiating waves of different frequency and positioned on opposite sides of the desired line of flight of the aircraft at a first landing field, means for heterodyning the waves radiated from said emitters to obtain a first reference signal, a pair of vertically spaced emitters for radiating signals differing in frequency from each other, said vertically spaced emitters being respectively positioned above and below the desired line of flight of the aircraft, means for heterodyning the signals radiated by said vertically spaced emitters to obtain a second reference signal, means for transmitting said first and second reference signals as modulation components upon at least one space radiated carrier wave, and means for adjusting the phase of each of the reference signals prior to its modulation upon the carrier wave; said system also comprising receiving and translating apparatus on said aircraft responsive to all of the radiated waves and signals for producing different indications of the position of the aircraft relative to the desired line of flight, said apparatus including first indicating means jointly responsive to the waves from said horizontally spaced emitters and to said first reference signal for producing an indication of the horizontal position of said aircraft relative to the desired line of flight, and second indicating means jointly responsive to the signals from said vertically spaced emitters and to said second reference signal for producing an indication of the vertical position of the aircraft relative to the desired line of flight, and means for adjusting the receiving and translating apparatus to alter the horizontal and vertical position indications so that when the receiving and translating apparatus is located at a known position relative to the desired line of flight one of said adjusting means may be adjusted until the indications on the first and second indicating means correspond to the known position, thereby to correlate the receiving and translating apparatus with the emitters and also to permit the receiving and translating apparatus to be moved to a known location at a second landing field provided with transmitting equipment like that at the first field, the receiving and translating apparatus being correlated with the emitters at the second field by operation of the means for adjusting the phase of the reference signals until the horizontal and vertical indications agree with the known location of the receiving and translating apparatus at the second field.

12. A system for landing an aircraft by guiding it along a desired line of flight, comprising transmitting equipment including a pair of horizontally spaced emitters radiating waves of different frequency and positioned on opposite sides of and equidistant from the desired line of flight of the aircraft at a first landing field, means for heterodyning the waves radiated from said emitters to obtain a first beat frequency signal, means for transmitting a first reference signal derived from said first beat frequency signal as a modulation component upon a space radiated carrier wave, a pair of vertically spaced emitters for radiating signals differing in frequency from each other and from the waves radiated by said horizontally spaced emitters, said vertically spaced emitters being respectively positioned above and below and equidistant from the desired line of flight of the aircraft, means for heterodyning the signals radiated by said vertically spaced emitters to obtain a second beat frequency signal, means for transmitting a second reference signal derived from said second beat frequency signal as a modulation component upon a space radiated carrier wave, and means for adjusting the phase of each of the reference signals prior to its modulation upon the carrier wave; said system further comprising receiving and translating apparatus on said aircraft responsive to all of the radiated waves and signals for producing different indications of the position of the aircraft relative to the desired line of flight, said apparatus including first indicating means jointly responsive to the waves from said horizontally spaced emitters and to said first reference signal for producing an indication of the horizontal position of said aircraft relative to the desired line of flight, and second indicating means jointly responsive to the signals from said vertically spaced emitters and to said second reference signal for producing an indication of the vertical position of the aircraft relative to the desired line of flight, and means for adjusting the receiving and translating apparatus to alter the horizontal and vertical position indications so that when the receiving and translating apparatus is located at a known position relative to the desired line of flight one of said adjusting means may be adjusted until the indications on the first and second indicating means correspond to the known position, thereby to correlate the receiving and translating apparatus with the emitters and also to permit the receiving and translating apparatus to be moved to a known location at a second landing field provided with transmitting equipment like that at the first field, the receiving and translating apparatus being correlated with the emitters at the second field by operation of the means for adjusting the phase of the reference signals until the horizontal and vertical indications agree with the known location of the receiving and translating apparatus at the second field.

13. A system for landing an aircraft by guiding it along a desired line of flight, comprising transmitting equipment including a first pair of horizontally spaced emitters radiating waves of different frequency and positioned equidistant from and along a line normal to the desired line of flight of the aircraft at a first landing field, said first pair of emitters being spaced apart approximately one-half wave length of the mean frequency between the wave radiated by said first pair of emitters, means for heterodyning the waves radiated from said first pair of emitters to obtain a first reference signal, means for transmitting said reference signal as a modulation component upon a space radiated carrier wave, a second pair of vertically spaced emitters for radiating signals differing in frequency from each other and from the waves radiated by said horizontally spaced emitters, said vertically spaced emitters being positioned equidistant from and along a line normal to the desired line of flight of the aircraft, said second pair of emitters being spaced apart approximately one-half wave length of the mean frequency between the signals radiated by said second pair of emitters, means for heterodyning the signals radiated by said vertically spaced emitters to obtain a second reference signal, means for transmitting said second reference signal as a modulation component upon a space radiated carrier wave, and means for adjusting the phase of each of the reference signals prior to its modulation upon the carrier wave; said system also comprising receiving and translating apparatus on said aircraft responsive to all of the radiated waves and signals for producing different indications of the position of the aircraft relative to the desired line of flight, said apparatus including first indicating means jointly responsive to the waves from said horizontally spaced emitters and to said first reference signal for producing an indication of the horizontal position of said aircraft relative to the desired line of flight, and second indicating means jointly responsive to the signals from said vertically spaced emitters and to said second reference signal for producing an indication of the vertical position of the aircraft relative to the desired line of flight, and means for adjusting the receiving and translating apparatus to alter the horizontal and vertical position indications so that when the receiving and translating apparatus is located at a known position relative to the desired line of flight one of said adjusting means may be adjusted until the indications on the first and second indicating means correspond to the known position, thereby to correlate the receiving and translating apparatus with the emitters and also to permit the receiving and translating apparatus to be moved to a known location at a second landing field provided with transmitting equipment like that at the first field, the receiving and translating apparatus being correlated with the emitters at the second field by operation of the means for adjusting the phase of the reference signals until the horizontal and vertical indications agree with the known location of the receiving and translating apparatus at the second field.

14. A system for landing an aircraft by guiding it along a desired line of flight, comprising transmitting equipment including a first pair of horizontally spaced emitters radiating waves of different frequency and positioned equidistant from and along a line extending normal to the desired line of flight of the aircraft at a first landing field, said first pair of emitters being spaced apart approximately one-half wave length of the mean frequency of the waves radiated by said first pair of emitters, means for heterodyning the waves radiated from said first pair of emitters to obtain a first beat frequency signal, means for transmitting a first reference signal derived from said first beat frequency signal as a modulation component upon a space radiated carrier wave, a second pair of vertically spaced emitters for radiating signals differing in frequency from each other and from the waves radiated by said horizontally spaced emitters, said vertically spaced emitters being positioned equidistant from and along a line extending normal to the desired line of flight of the aircraft, said second pair of emitters being spaced apart approximately one-half wave length of the mean frequency between the signals radiated by said second pair of emitters, means for heterodyning the signals radiated by said vertically spaced emitters to obtain a second beat frequency signal, means for transmitting a second reference signal derived from said second beat frequency signal as a modulation component upon a space radiated carrier wave, and means for adjusting the phase of each of the reference signals prior to its modulation upon the carrier wave; said system also comprising receiving and translating apparatus on said aircraft responsive to all of the radiated waves and signals for producing different indications of the position of the aircraft relative to the desired line of flight, said apparatus including means for heterodyning the waves from said horizontally spaced emitters to produce a third beat frequency signal, means for detecting said first reference signal, first indicating means for indicating the phase relationship between said third beat frequency signal and said first reference signal to provide an indication of the horizontal position of said aircraft relative to the desired line of flight, means for heterodyning the signals from said vertically spaced emitters to produce a fourth beat frequency signal, means for detecting said second reference signal, and second indicating means for indicating the phase relationship between said fourth beat frequency signal and said second reference signal to provide an indication of the vertical position of the aircraft relative to the desired line of flight, and means for adjusting the receiving and translating apparatus to alter the horizontal and vertical position indications so that when the receiving and translating apparatus is located at a known position relative to the desired line of flight one of said adjusting means may be adjusted until the indications on the first and second indicating means correspond to the known position, thereby to correlate the receiving and translating apparatus with the emitters and also to permit the receiving and translating apparatus to be moved to a known location at a second landing field provided with transmitting equipment like that at the first field, the receiving and translating apparatus being correlated with the emitters at the second field by operation of the means for adjusting the phase of the reference signals until the horizontal and vertical indications agree with the known location of the receiving and translating apparatus at the second field.

15. A system for landing an aircraft by guiding it along a desired line of flight, comprising transmitting equipment including a pair of horizontally spaced emitters radiating waves of different frequency and so positioned that a line extending therebetween is normal to the desired line of flight of the aircraft at a first landing field, means for heterodyning the waves radiated from said emitters to obtain a first reference signal, means for transmitting said reference signal as a modulation component upon a space radiated carrier wave, a pair of vertically spaced emitters for radiating signals differing in frequency from each other and from the waves radiated by said horizontally spaced emitters, said vertically spaced emitters being so positioned that a line extending therebetween is normal to the desired line of flight of the aircraft, means for heterodyning the signals radiated by said vertically spaced emitters to obtain a second reference signal, means for transmitting said second reference signal as a modulation component upon a space radiated carrier wave, and means for adjusting the phase of each of the reference signals prior to its modulation upon the carrier wave; said system further comprising receiving and translating apparatus on said aircraft responsive to all of the radiated waves and signals for producing different indications of the position of the aircraft relative to the desired line of flight, said apparatus including first indicating means jointly responsive to the waves from said horizontally spaced emitters and to said first reference signal for producing an indication of the horizontal position of said aircraft relative to the desired line of flight, and second indicating means jointly responsive to the signals from said vertically spaced emitters and to said second reference signal for producing an indication of the vertical position of the aircraft relative to the desired line of flight, and means for adjusting the receiving and translating apparatus to alter the horizontal and vertical position indications so that when the receiving and translating apparatus is located at a known position relative to the desired line of flight one of said adjusting means may be adjusted until the indications on the first and second indicating means correspond to the known position, thereby to correlate the receiving and translating apparatus with the emitters and also to permit the receiving and translating apparatus to be moved to a known location at a second landing field provided with transmitting equipment like that at the first field, the receiving and translating apparatus being correlated with the emitters at the second field by operation of the means for adjusting the phase of the reference signals until the horizontal and vertical indications agree with the known location of the receiving and translating apparatus at the second field.

References Cited in the file of this patent

UNITED STATES PATENTS

| | | |
|---|---|---|
| 2,198,113 | Holmes | Apr. 23, 1940 |
| 2,248,727 | Strobel | July 8, 1941 |
| 2,838,753 | O'Brien et al. | June 10, 1958 |
| 2,913,719 | Hasbrook | Nov. 17, 1959 |